(No Model.)
W. H. WHITE.
COMBINED HARROW, ROLLER, AND CULTIVATOR.
No. 288,900. Patented Nov. 20, 1883.
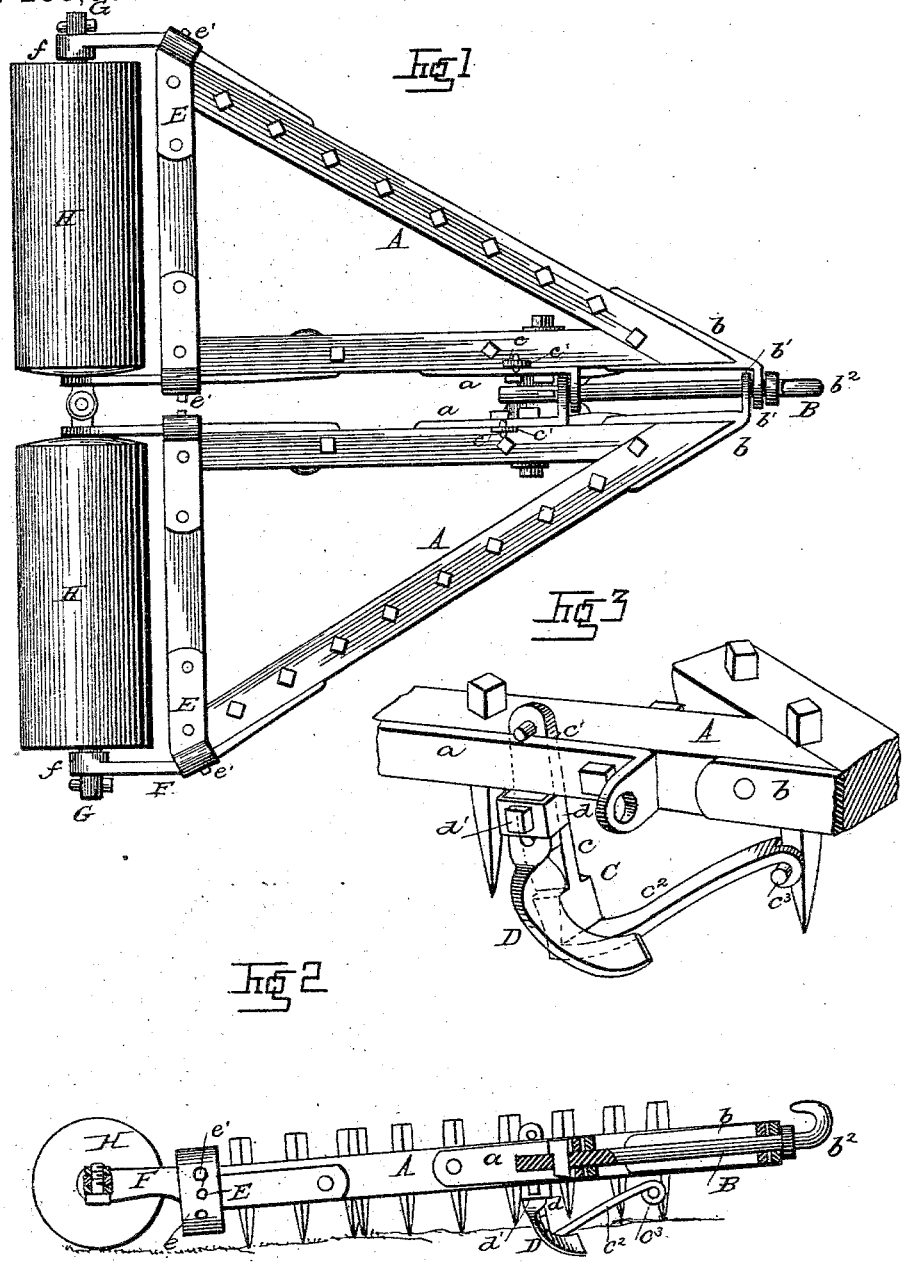
WITNESSES:
Fred. G. Dieterich
John C. Kennon
INVENTOR:
W. H. White
BY Mann & Co.
ATTORNEYS.
N. PETERS. Photo-Lithographer. Washington. D. C.

UNITED STATES PATENT OFFICE.

WILLIAM H. WHITE, OF CINCINNATI, OHIO.

COMBINED HARROW, ROLLER, AND CULTIVATOR.

SPECIFICATION forming part of Letters Patent No. 288,900, dated November 20, 1883.

Application filed April 14, 1883. (No model.)

*To all whom it may concern:*

Be it known that I, WILLIAM H. WHITE, of Cincinnati, in the county of Hamilton and State of Ohio, have invented a certain new and useful Improvement in a Combined Harrow, Roller, and Cultivator, of which the following is a full, clear, and exact description.

The object of my invention is to provide a combined harrow, roller, and cultivator in which one of said devices may be used separately, or two or all three be used in combination, as hereinafter more fully described.

My invention consists in hereinafter-described instrumentalities for attaining said object.

In the drawings, Figure 1 represents a top view of my improvement; Fig. 2, a longitudinal section on a line passing through the couplers of the harrow-sections; and Fig. 3, a detail view of one of the cultivator and foot pieces, showing their manner of attachment.

A represents the frames of the harrow-sections, said sections being constructed in the form of right-angle triangles, and held together by coupling-straps $a$ $b$ and draft-rod B. The coupling-straps $a$ consist of metal plates secured to the harrow-sections and provided with extremities set at right angles to said straps, and having annular openings therein for the admission of the draft-bar. The coupling-straps $b$ consist of metal plates lapping the extremities of the harrow-sections, and provided with ears $b'$, having holes therein for the admission of the draft-bar. Said draft-bar is passed through said holes or annular openings, and secured in rear of the straps $a$ by means of a pin fitted into a slot in the extremity of said bar. Said bar at its outer end is provided with a hook, $b^2$, to which the draft is attached.

Beneath the coupling-straps $a$ are situated the foot-pieces C. These foot-pieces consist of upright slides $c$, which work in grooves $c'$, formed in the frames of the harrow-sections, and are held in said grooves by the aforesaid straps $a$. Made integral with these slides are curved runners $c^2$, which are provided on their forward extremities with eyes through which pass bolts or staples $c^3$. By this construction it will be seen that said foot-pieces may be elevated or depressed by raising or lowering the slides $c$. Said slides are held in any desired position by means of pins which are passed through orifices formed therein. (Not shown in the drawings.)

Attached to slides $c$ are the cultivators D. These cultivators are shaped on the sides next the slides so as to fit snugly against shoulders formed upon the runners, and they are provided with necks having perforations therein. Apertured collars $d$ encompass said necks and adjacent slides, and bolts $d'$ pass through said collars, necks, and slides, and are held in place by nuts. It will thus be seen that the cultivators are firmly fixed to the foot-pieces, and may be raised or lowered with the same.

At the rear of the harrow-sections are secured guides E, and in said guides work arms F. Said arms are pivoted at their inner ends to the frames of the harrow-sections, and upon their outer extremities are provided with eyes $f$, which form bearings for the roller-shafts G. Said shafts are hinged together at their inner ends by a bolt passing through eyes formed in said ends and secured in place by a nut. The outer ends of said shafts are slotted and held in position by pins passing through the slots. Revolving upon said shafts are the rollers H. The guides E are provided with holes $e$, through which pins $e'$ may be inserted to lock the rollers in an elevated or depressed position. It will thus be seen that the rollers, through the medium of the pivoted arm F, may be raised or lowered, and by the insertion of the pins through the guide E may be locked in the desired position.

The operation of my improvement is as follows: When it is desired to use the harrow, rollers, and cultivators in combination, the foot-pieces C are adjusted so as to bring the points of the cultivators and harrow-teeth in about the same plane, and the rollers are allowed to have free vertical play in the guides. If it be desired to throw the harrow out of action, the foot-pieces and the cultivators are depressed and locked in position, and the roller-arms are also depressed and fixed by the insertion of the pins. By these means the harrow-teeth are elevated above the surface of the ground. If it be desired to use the harrow without the rollers, the roller-arms are elevated and the pins inserted, whereby said rollers are raised above the ground. It may be, furthermore, seen that the rollers may be detached from the arms by unbolting the inner ends of the shafts, removing the draft-rod, withdrawing the shafts, and reinserting said draft-rod, thus leaving the harrow in its normal condition; or the cultivators may be detached by removing the bolt and the restraining collar. It will also be seen that by elevating the foot-pieces to their greatest height the cultivator may be thrown out of play, and the harrow alone, or the harrow and rollers combined, be allowed to work.

Having thus described my invention, what I claim is—

1. The combination, with the harrow-sections A and the hinged and adjustable foot-pieces C, of the cultivator D, constructed substantially as herein shown and described, and adjustably secured to the part $c$ of the foot-pieces, as and for the purpose set forth.

2. The combination of a harrow provided with adjustable foot-pieces, vertically-adjustable cultivators secured to said harrow, and vertically-adjustable rollers secured in the rear of said harrow, all arranged in the manner described, whereby the harrow or rollers may be used alone, or in combination with the cultivators, for the purposes set forth.

WILLIAM H. WHITE.

Witnesses:
WILLIAM MULLENGER,
WILLIAM HENRY FRANKLIN.